March 19, 1940. E. A. BALLEW 2,194,110

METHOD OF ARTIFICIALLY GRAINING SURFACES

Filed May 23, 1938

INVENTOR
EDWARD A. BALLEW.
BY
Cook & Robinson
ATTORNEY

Patented Mar. 19, 1940

2,194,110

UNITED STATES PATENT OFFICE 2,194,110

METHOD OF ARTIFICIALLY GRAINING SURFACES

Edward A. Ballew, Everett, Wash.

Application May 23, 1938, Serial No. 209,424

1 Claim. (Cl. 41—25)

This invention relates to a means for and method of artificially graining prepared surfaces, and it has reference more particularly to the reproducing, in appearance, on a prepared surface, the graining of any wood surface that may be selected as a pattern. Specifically, the invention relates to the reproduction of the graining designs that are presented by the woods commonly used in cabinet, furniture or fixture manufacturing and referred to as "open pored" woods, including mahogany, oak, walnut, and woods of a similar structure.

It is the principal object of this invention to provide a method whereby the reproduction of the grain of the selected pattern may be accurately and quickly made; furthermore, a method which permits the reproduction of the grain to be made on surfaces of irregular form, as well as on flat or plane surfaces.

More specifically stated, the objects of the invention reside in the novel method of preparing a pattern surface and making a matrix from the prepared surface, together with the method of preparing a flexible printing plate, or sheet, from the matrix for use in the application of a paint, stain or the like to a selected surface for the reproduction of the graining pattern thereon.

Other objects of the invention reside in the various steps and in the sequence followed in the preparation of the matrix and the printing sheet.

Still further objects reside in the printing sheet itself.

In accomplishing these and other objects of the invention, I have provided the various steps, and sequence as illustrated in the accompanying drawing, wherein—

Figure 1:
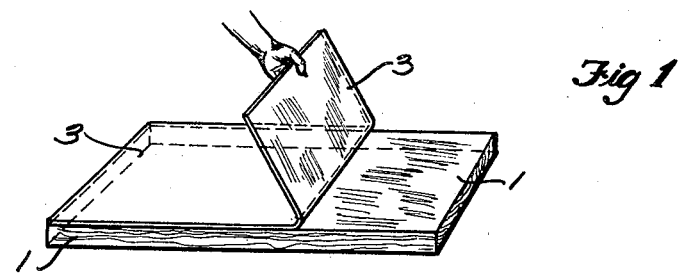
Fig. 1 is a perspective view illustrating the removal of the matrix film from the prepared surface of the selected pattern piece.
Figure 2:
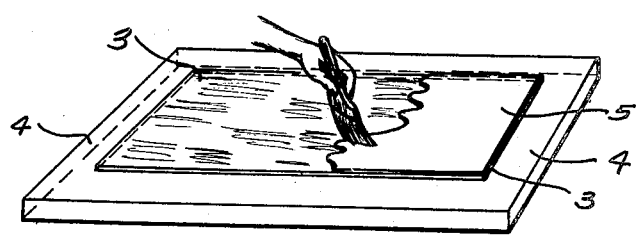
Fig. 2 is a perspective view illustrating the application of the liquid rubber to the matrix sheet for the formation of the printing sheet.
Figure 3:
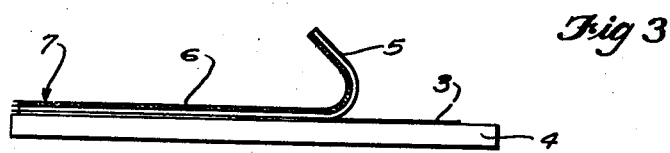
Fig. 3 is an enlarged, cross sectional view of a portion of the printing sheet and the matrix sheet; showing the removal of the former from the latter.

Briefly describing the present invention: The method begins with the preparing of the surface of a selected pattern piece and the applying of a coat of liquid material thereto which material, upon setting, forms a thin film that may be peeled from the pattern surface in sheet form. The film, when removed, has the surface thereof that was adjacent the pattern surface, formed with all the indentures, ridges, irregularities or flat surfaces of the pattern sheet, as will readily be understood. This film, which constitutes the matrix sheet, is then placed upon a flat surface, with its matrix surface facing upward, and a coat of liquid rubber is applied to the top surface. This rubber coating is suitably reinforced by alternate layers of fabric and rubber and after the body has set, the sheet is peeled from the matrix sheet in a single sheet and used as a printing plate or sheet for reproducing the graining of the pattern sheet on a prepared surface.

Referring more in detail to the drawing—

In Fig. 1, I have illustrated, at 1, a piece of wood selected as a pattern piece. The selected surface would first be smoothed down, then sanded, or brushed with a wire brush, or the like, so that the softer material will be removed and the harder grain forming material will stand out in relief. After this pattern surface has thus been prepared, it is given a coating of any suitable masking cream. This is done in order that the coating of matrix forming material, later to be applied, will not stick to the wood.

After treating the pattern surface with the masking cream, it is given a substantial coating of a selected material, in liquid form; for example, a solution consisting of cellulose acetate, dissolved in acetone. This is a thick liquid substance that will flow into and fill all the surface pores and irregularities of the prepared surface of the pattern. This coating is permitted to dry and set and it is then sanded smooth while on the pattern piece. After thorough drying, the coating may be peeled off from the pattern piece as a single sheet of material. This sheet of material, which has the appearance and characteristics of a piece of Celluloid, is what I refer to as the matrix sheet, and it is designated by reference numeral 3.

To prepare the printing sheet from the matrix sheet, the matrix is placed flatly upon and cemented to a smooth flat backing plate 4 with the patterned surface thereof facing upwardly.

After the matrix sheet 3 is thus secured in place upon the backing 4, it is given a coating 5 of liquid rubber of a self-vulcanizing character. The coating operation is best accomplished and is preferably done at room temperature. Then, before the rubber coating 5 has set, a sheet of suitable cloth or fabric 6 is vulcanized thereto. Then, if it is thought desirable, more rubber and additional sheets of cloth or fabric may be alternately added to build up a strong laminated sheet which has been designated at 7, and is referred to as the printing sheet.

Figure 4:
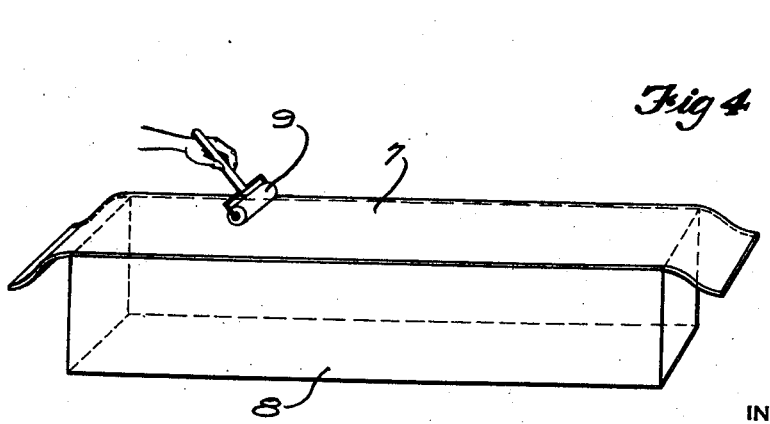
Fig. 4 is a perspective view illustrating the application of the printing sheet to a surface for reproducing the graining effect of a pattern surface.

After this built up sheet 6 has become vulcanized, or cured, it may be peeled from the cellulose matrix 3 and it will be found that the rubber surface that was next to the matrix sheet, will contain therein all the irregularities, projections or indentures of the pattern piece. This printing sheet 7 is then ready for use for the printing of the grain design of the pattern piece, and it is used in the following manner: First, the printing surface of the sheet is inked by brushing thereon an ink, which might be any dry color pigment, mixed in a liquid vehicle of a character that is not injurious to the rubber. Then the inked surface is wiped to remove therefrom all of the color matter or ink except that which will be contained or retained within the grain design grooves. The inked sheet is then placed with the inked surface against the surface to be grained, and a hard roller, or the like, is pressed against and moved back and forth across the outer surface thereof to cause the ink to be transferred to the surface that is to be grained. Then the printing sheet is removed. In Fig. 4, the piece to be grained is indicated at 8 and 9 is the roller used to facilitate the printing.

One of the principal advantages in this method of graining is that any selected pattern of wood grain may be accurately reproduced. The application of the cellulose film and the setting of the solution requires only a few moments, as does also the applying of the liquid rubber coating to the matrix sheet. The completed printing sheet is practically indestructible and may be used numerous times. It requires only the inking operation after each, or a few, uses.

A special advantage resides in the fact that the printing sheet may be applied to surfaces that are not flat, such as over objects that are round or which contain moldings which would, because of surface irregularities, make it practically impossible to grain by the usual methods.

Having thus described my invention, what I claim as new therein and desire to secure by Letters Patent is:

The method of artificially graining a prepared surface which comprises treating a wood surface that has been selected as a pattern to remove the softer material and to present the natural graining in relief, applying a masking cream to the treated surface, forming a platen therefrom by the application of a coating of a solution of cellulose acetate dissolved in acetone, allowing the coating to solidify and then stripping the coating as a single sheet from the wood surface, then forming a printing sheet from the platen by an application of a coating of quick setting rubber to the platen surface, reinforcing the coating by laminations of backing fabric or the like, and finally removing the printing sheet thus formed, applying a printing ink to the printing surface thereof and imprinting on the surface to be grained by an application of pressure against the sheet.

EDWARD A. BALLEW.